(12) United States Patent
Hämäläinen et al.

(10) Patent No.: US 6,249,584 B1
(45) Date of Patent: *Jun. 19, 2001

(54) METHOD FOR INDICATING ENCIPHERING OF DATA TRANSMISSION BETWEEN A MOBILE COMMUNICATION NETWORK AND A MOBILE STATION

(75) Inventors: Jari Pekka Hämäläinen; Reijo Uolevi Paajanen; Markku Matias Rautiola, all of Tampere; Markku Juhani Rossi, Tikkakoski, all of (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,970

(22) Filed: Dec. 10, 1996

(30) Foreign Application Priority Data

Dec. 15, 1995 (FI) .......................................... 956036

(51) Int. Cl.⁷ ....................................... H04L 9/00

(52) U.S. Cl. ............................................................. 380/270

(58) Field of Search .................................. 380/1, 2, 9, 49; 455/414, 423, 433, 566, 553, 437, 550

(56) References Cited

U.S. PATENT DOCUMENTS

| | | | |
|---|---|---|---|
| 3,781,472 | * 12/1973 | Goode et al. | 380/2 |
| 4,555,805 | * 11/1985 | Talbot | 380/33 |
| 5,077,791 | * 12/1991 | Salihi | 380/23 |
| 5,199,069 | *  3/1993 | Barrett et al. | 380/28 |
| 5,335,355 | *  8/1994 | Tanaka et al. | 455/553 |
| 5,564,077 | * 10/1996 | Obayashi et al. | 455/553 |
| 5,852,662 | * 12/1998 | Forgues | 380/9 |

* cited by examiner

Primary Examiner—Gail Hayes
Assistant Examiner—James Seal
(74) Attorney, Agent, or Firm—Perman & Green, LLP

(57) ABSTRACT

The invention relates to a method for indicating enciphering of data transmission between a mobile communication network and a mobile station (MS) in the mobile communication network, wherein signals transferred between a mobile communication network and a mobile station are monitored, and on the basis of the signal monitored, the cipher mode is indicated to the user of the mobile station.

77 Claims, 9 Drawing Sheets

METHOD FOR INDICATING ENCIPHERING OF DATA TRANSMISSION BETWEEN A MOBILE COMMUNICATION NETWORK AND A MOBILE STATION

BACKGROUND OF THE INVENTION

The invention relates to a method and an apparatus for indicating enciphering of data transmission between a mobile communication network and a mobile station in the mobile communication network.

In mobile networks, at least part of the data transmission is wireless communication using radio transmitters and receivers. The radio channel is a physically open resource available to anyone by means of suitable communication equipment. This involves security risks, such as eavesdropping or disclosure of privacy of location. In digital mobile networks, such as GSM networks, digital data transmission is used which is difficult to eavesdrop. Further, it is possible to use identification of the caller and enciphering in data transmission. For preventing eavesdropping in digital mobile networks, enciphering methods have been developed for enciphering the speech and data signals modified in digital form. Moreover, enciphering can be used in the transmission of other information via the radio channel, such as identification data on the mobile station (International Mobile Subscriber Identity, IMSI) and on the location (Location Area Identification, LAI). In the receiver, the enciphered signal is deciphered back to deciphered speech and data. A so-called encryption key and algorithm are advantageously known to the respective sending and receiving devices only, wherein given the effective encryption algorithms presently in use, decoding a coded signal to intelligible speech and data as well as into processing signals of the bit stream by force or illegally, i.e. without the correct encryption key and algorithm, is practically impossible.

The most common digital mobile networks are cellular networks. The base station subsystem (BSS) of the mobile network comprises base transceiver stations (BTS) and base station controllers (BSC). The mobile station (MS) communicates via the radio channel with a base station close to the respective location of the mobile station. The base station communicates with the base station controller. Data transmission between the base station and the base station controller takes place usually via a cable. One base station controller controls over a group of several base stations. The base station controller, in turn, communicates with a mobile services switching centre (MSC). Several mobile services switching centres, in turn, can communicate with each other as well as with a landline communication network centre (PSTN, ISDN). The information to be transmitted is usually divided into frames containing control information, speech and data converted into digital form, and error correction information. The frame structure can have several levels, wherein frames of a higher level are formed by arranging frames of a lower level. Enciphering can be used both with control information and with speech and data. Moreover, enciphering can be realized by using different encryption keys and algorithms at different frame levels. An example of a digital data transmission network is the GSM network, the standard of which contains definitions of the enciphering methods and algorithms to be used.

In the GSM network, making a mobile-originated call is conducted in a way that a GSM mobile station and the GSM system network give signals, i.e. transmit control and identification information required for making a call. In response to a request for a connection, the GSM mobile station is allotted a channel for signalling, if this is possible within the capacity of the GSM system network. On this channel, the GSM mobile station requests speech or data service from the GSM system network. On the side of the GSM system network, this request is transmitted to a mobile services switching centre (MSC), where the rights of the GSM subscriber are checked from a visitor location register (VLR).

Upon a mobile-terminated call e.g. from a subscription of a landline telephone network, the operator of the telephone network transmits e.g. the number of the receiving telephone to the mobile services switching centre. The mobile services switching centre finds out the rights of the GSM subscriber from the home location register (HLR) and from the visitor location register (VLR). After this, the GSM system network and the GSM mobile station transmit the control and identification information required for making a call.

Depending on the implementation and the configuration of the parameters, the visitor location register VLR can make a request via the mobile services switching centre to the GSM mobile station for exchange of identification information and start of enciphering. This request is made in a so-called cipher mode command message. It is, however, possible to make a call also without exchange of identification information and enciphering. In other words, the call is either enciphered or not enciphered depending on the network parameters set by the GSM system network operator.

In most common mobile communication networks currently available, however, enciphering is not optional to a user of the mobile communication network but usually an alternative function offered by the operator of the mobile network, wherein when current wireless data transmission equipment is used, the user has no certainty whether the data transmission is enciphered or not. Particularly when the mobile station is moving, the mobile station can be transferred from the area of one base station system to the area of another base station system, wherein the cipher mode of data transmission can be changed.

SUMMARY OF THE INVENTION

One purpose of the present invention is to eliminate the disadvantages described above and to provide a method for indicating enciphering of data transmission to the user of the mobile communication network. The invention is based on the idea that control signals used in data transmission between a mobile network and a mobile station are monitored and when a control signal for enciphering is detected, the cipher mode is signalled with a cipher mode indicator connected to the mobile station. The method of the invention is characterized in that signals transferred between a mobile communication network and a mobile station are monitored, and on the basis of the signal monitored, the cipher mode is indicated to the user of the mobile station.

The apparatus according to the invention is characterized in that the apparatus comprises means for monitoring signals transferred between a mobile communication network and a mobile station, and means for indicating the cipher mode to the user of the mobile station.

The invention gives significant advantages. Using the method of the invention, the user of a data transmission device is always aware of whether the data transmission is enciphered or not. Further, by using the method of the invention, it is possible to indicate a possible change in the cipher mode during the data transmission to the user of the data transmission device.

BRIEF DESCRIPTION OF THE DRAWING

In the following, the invention will be described in more detail with reference to the appended drawings. In the drawings.

DETAILED DESCRIPTION OF THE INVENTION

Figure 1A:
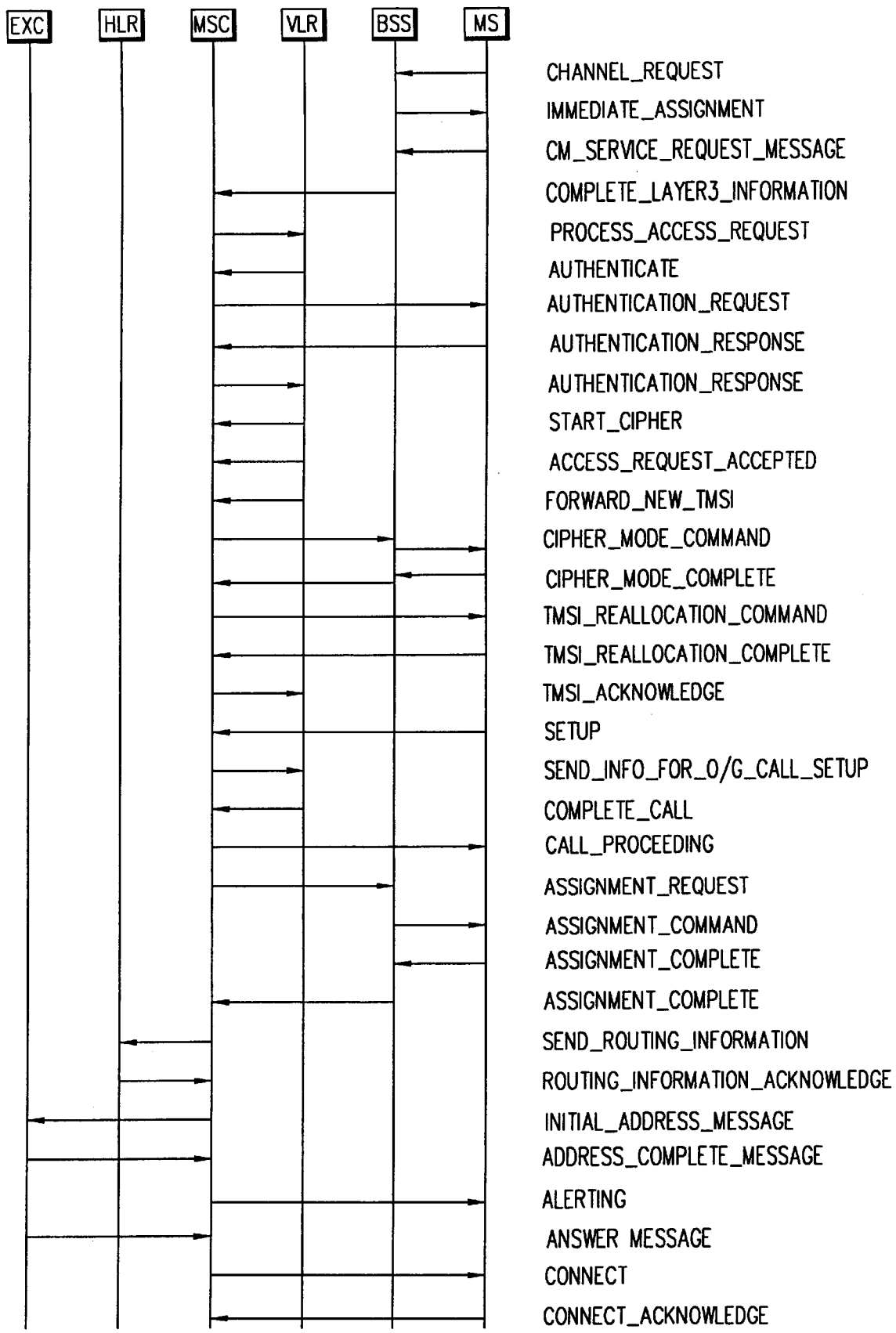
FIG. 1a shows the call set-up signals during a mobile-originated call in the GSM mobile communication network.
Figure 1B:
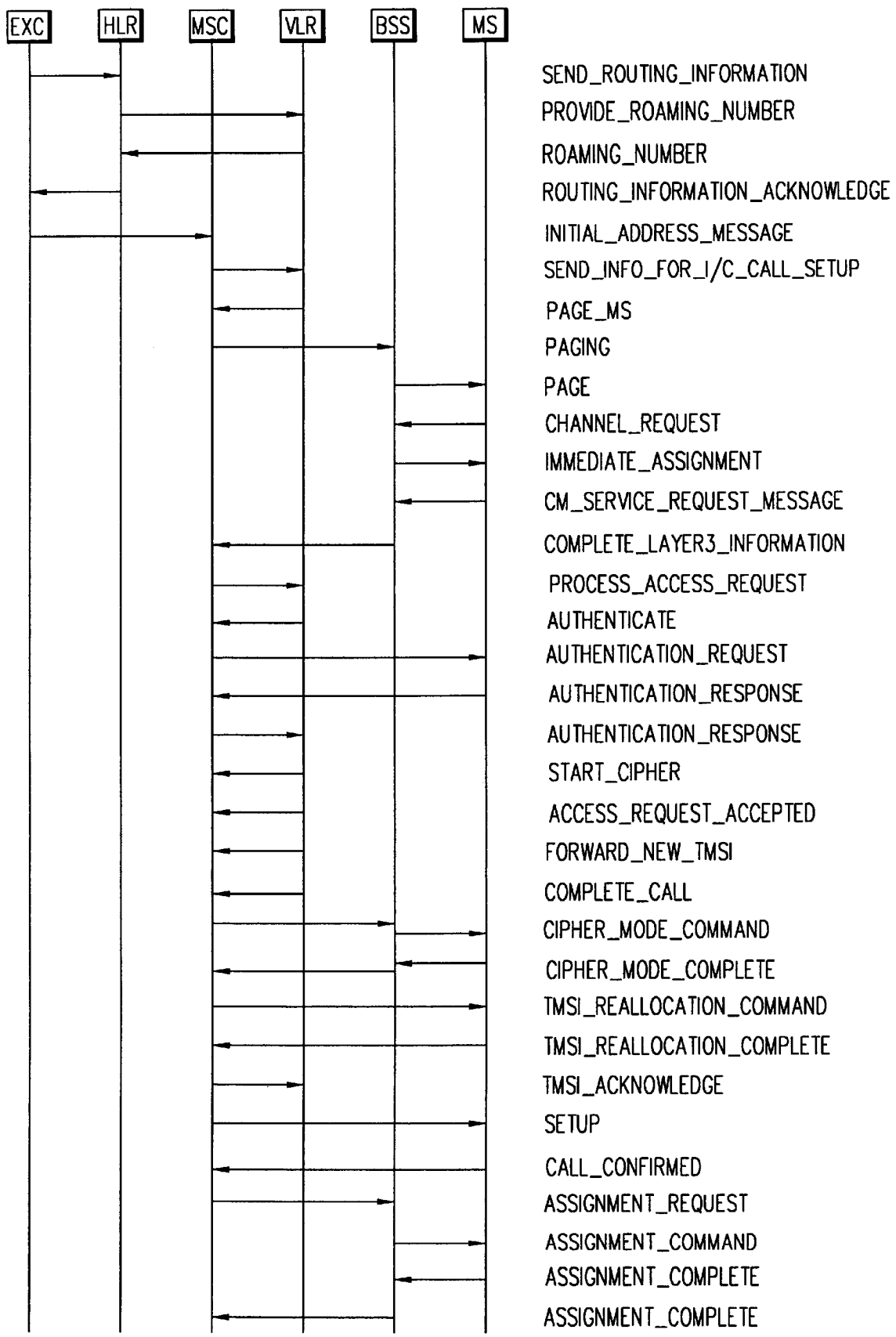
FIG. 1b shows the call set-up signals during a mobile-terminated call in the GSM mobile communication network.

FIG. 1a shows call set-up signalling during a mobile-originated call and FIG. 1b shows call set-up signals during a mobile-terminated call in the GSM mobile communication network. During call set-up signalling, enciphering information is exchanged if the cipher mode is set on. Upon call set-up signalling, the mobile communication network sends a cipher mode command message requesting the mobile station MS to start enciphering. When the mobile station MS receives this message, it sets a cipher indication data field CIND to show that the cipher mode is on. The cipher indication data field CIND used can be e.g. a predetermined binary digit. Thus the value of the binary digit can be either a logical "0" or a logical "1". For example in logical circuits having an operating voltage of 3 V, the logical "0" value corresponds advantageously to a voltage value of approximately 0 V and the logical "1" value corresponds to a voltage of approximately 3 V, which is known as such. The cipher indication data field CIND used can be naturally any other data field as well, such as a byte, wherein advantageously when the value of the byte is zero, the cipher mode is off and, in a corresponding manner, when the value of the byte of different from zero, the cipher mode is on. The contents of the cipher indication data field CIND is cleared upon starting up the mobile station MS and always after a call has been ended. When the user starts a new call and the call set-up signalling advances, the value of the cipher indication data field CIND is changed in connection with the exchange of ciphering information to be different from zero, i.e. to indicate that the cipher mode is on.

Figure 2:
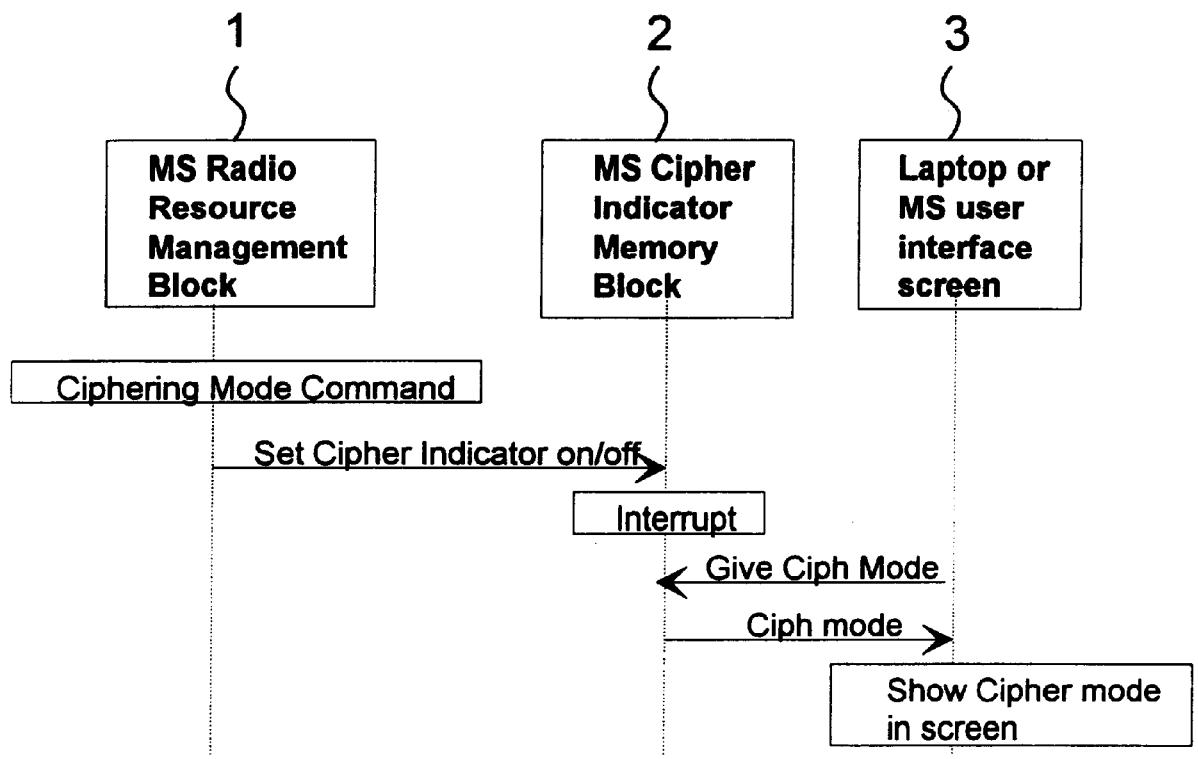
FIG. 2 is a signal chart showing detection of the cipher mode by the principle of interrupting.

Now referring to FIG. 2, when the resource control block 1 of the mobile station MS detects a cipher control signal in the communication between the mobile station and the base station, the resource control block sets the value of the cipher indication data field CIND in a cipher indicator memory block 2 to correspond with the cipher indication data. The cipher indicator memory block 2 reads the value of the cipher indication data field and detects that a new value has been set in it, wherein the cipher indicator memory block 2 makes a request for interruption. A user interface block 3 detects the request for interruption, wherein it sends an enquiry on the cipher mode to the cipher indicator memory block 2 which returns the data on the cipher mode to the user interface block 3. Following this, the user interface block 3 sets the cipher indicator to the mode corresponding to the ciphering data, for example with a certain sign on the display of the mobile station. The change of the cipher mode can also be indicated with an acoustic signal, wherein the user notices the change in the cipher mode also when talking to a mobile station. Thus the user does not need to have visual contact with the display of the mobile station. The user of the mobile station is informed of the cipher mode at the beginning of and during the call. This is important particularly in situations where the cipher mode can be changed during the call, for example when the mobile station is moving.

Figure 3:
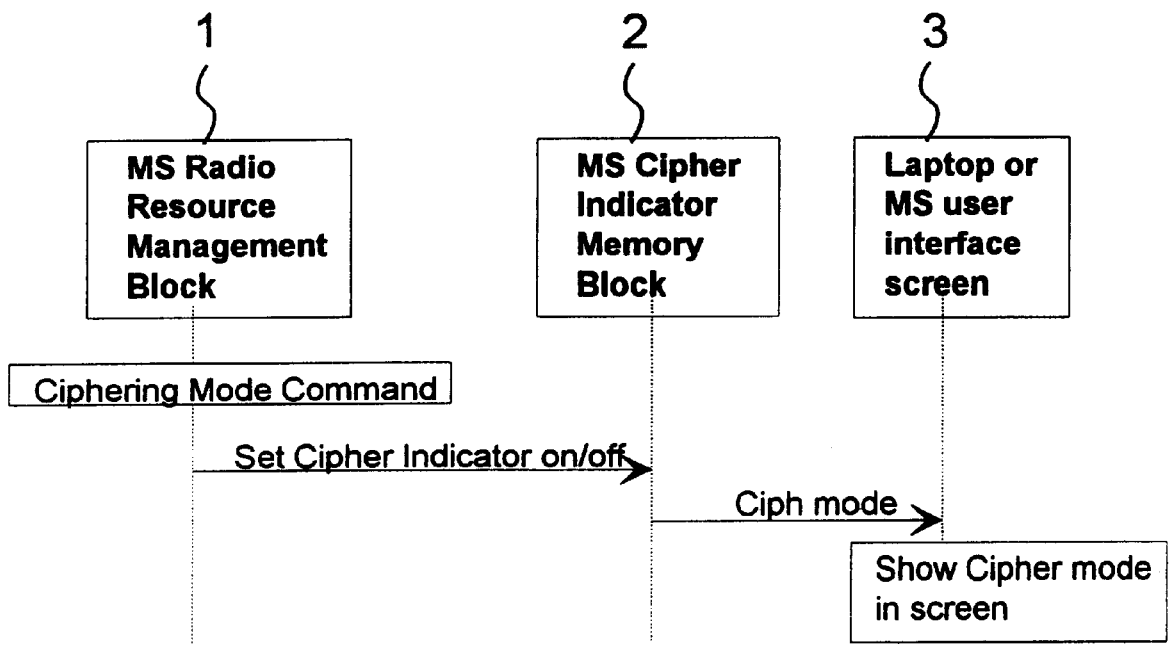
FIG. 3 is a signal chart showing an enquiry about the cipher mode.

FIG. 3 illustrates a second advantageous embodiment of the method according to the invention. Here the difference to the embodiment of FIG. 2 lies primarily in that a change in the cipher indication data field does not lead to a request for interruption but the cipher indicator memory block 2 sends the cipher information to the user interface block 3 whenever the value in the cipher indicator memory block is changed. In other respects, the operation of the embodiment shown in FIG. 3 corresponds substantially to the operation of the embodiment shown in FIG. 2.

Figure 4:
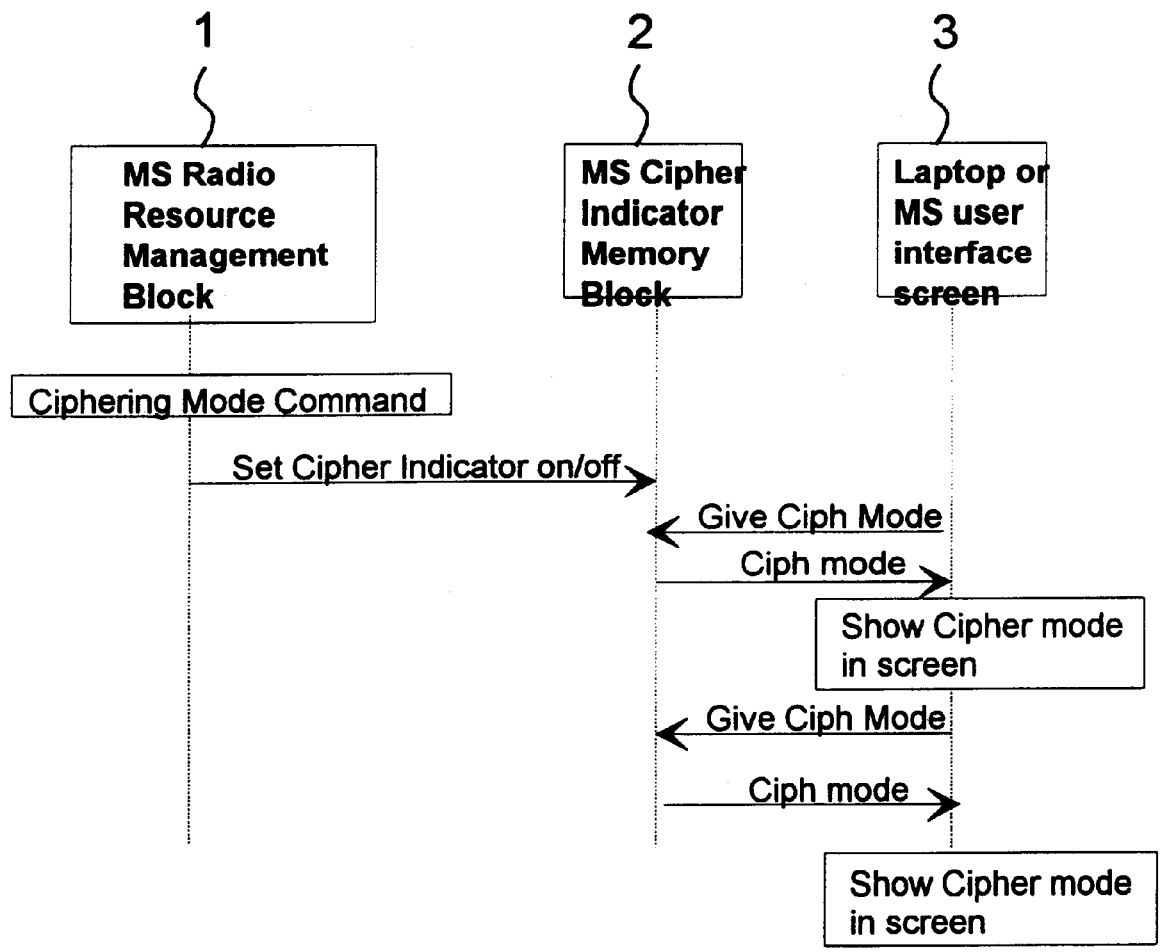
FIG. 4 is a signal chart showing detection of the cipher mode when enquiries at regular intervals are used.

FIG. 4 illustrates a third advantageous embodiment of the method according to the invention, wherein the user interface block 3 sends cipher mode enquiry messages at regular intervals to the cipher indicator memory block 2. The cipher indicator memory block 2 sends a response to the enquiry to the user interface block 3 which will transmit the cipher information to the cipher indicator. In this embodiment, a separate message on the change in the cipher indication data field is not formed. When using this embodiment, the interval of sending enquiry messages must be kept sufficiently short in order to detect a change in the cipher mode sufficiently quickly. In this embodiment, it is advantageous to form a cipher mode enquiry message at least in those situations when the mobile station moves from the area of one base station system to the area of another base station system.

During a call, it is possible to transmit so-called short message services (SMS) to the mobile station. In the transmission of short messages, the cipher mode may deviate from the cipher mode of the call in question, wherein the method of the invention can be used to indicate the cipher mode separately for the call and for the short message services. Also a change in the cipher mode can be indicated to the user both for the call and for the short message services. For indicating the cipher mode and a change in the cipher mode, signals distinguishable from each other can be used, e.g. different acoustic signals, wherein the user of the mobile station is aware of the cipher mode of both the call and the short message services.

The method according to the present invention can also be applied in a way that the existence of enciphering is indicated to the user already before starting the call. This can be implemented advantageously by providing the menu structure of the mobile station with a function whereby the user can ask the mobile communication network about the cipher mode. When this function is selected from the menu, the mobile station sends the mobile network a message inquiring the cipher mode. In practice, this can be conducted in the GSM mobile network by forcing the mobile station to a location update procedure. This procedure contains starting of enciphering if the cipher mode is active in the mobile communication network. In this way, the mobile station can send to the mobile communication network an enquiry about the current cipher mode, which is indicated to the user e.g. by an icon in the display of the mobile station.

Problems may result in countries where enciphering is not allowed to be on during speech because of legislation or for another reason. However, enciphering can thus be on for signalling, i.e. the location update procedure shows cipher-on mode although it is not on for speech. Thus the mobile station can produce an acoustic signal when it turns on the speech channel and detects a change in the cipher mode, wherein the user will be informed that speech is not transferred in enciphered form.

Figure 5:
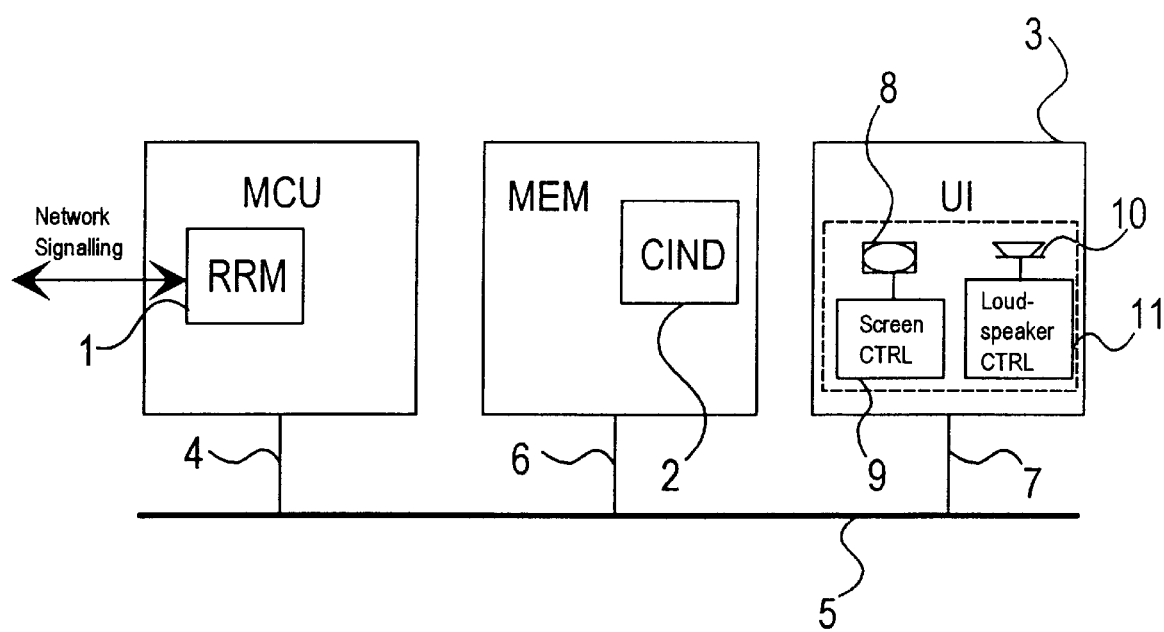
FIG. 5 is a reduced block diagram showing the location of the most essential blocks of a cipher mode indicating device in a mobile station according to an advantageous embodiment of the invention.

FIG. 5 is a reduced block diagram showing one embodiment of the apparatus according to the invention. A functional part of the central processing unit MCU consists of the resource control block 1 which processes signalling between the mobile communication network and the mobile station. The resource control block 1 is in a transmission connection via a first signal bus 4 to a data transmission bus 5. The data transmission bus 5 is connected with a memory block MEM by means of a second signal bus 6. Further, the data transmission bus 5 is connected with a user interface block UI via a third signal bus 7. The user interface block UI includes a visual display unit 8, a display unit control means 9, an acoustic signal forming element 10, and a control means 11 for the acoustic signal forming element. The display unit 8 is preferably the display of the mobile station, and the acoustic signal forming element 10 is preferably the sound generator of the mobile station, or the like.

Data transmission from the resource control block 1 to the cipher indication data field CIND is preferably controlled by the central processing unit MCU, wherein the central processing unit MCU reads the ciphering information and transmits it to the cipher indication data field CIND via the first signal bus 4, the transmission bus 5 and the second signal bus 6. Said buses can advantageously be arranged by known solutions used in connection with microcontrollers. Said signal buses can also be placed in the microcontroller itself, wherein the microcontroller comprises a central processing unit MCU, a resource control block 1, a cipher indicator memory block 2 comprising also the cipher indication data field CIND, as well as said signal buses 4, 6 and data transmission bus 5.

The central processing unit MCU has a data transmission connection also to the user interface block UI via the first signal bus 4, the data transmission bus 5 and the third signal bus 7. Consequently, the central processing unit MCU can advantageously control also the display unit control means 9 and the control means 11 for the acoustic signal forming element situated in the user interface block UI. This control can be arranged in a way that the central processing unit MCU sets the control line of the display unit control means 9 (not shown) to a logical "0" value (ca. 0 V) when the cipher mode is off. The central processing unit MCU sets the control line of the display unit control means 9 to a logical "1" value (for example ca. 3 V) when the cipher mode is on. Acoustic signal formation can be applied in a corresponding manner. Thus the central processing unit MCU sets the control line of the control means 11 for the acoustic signal forming element (not shown) to a logical "0" value, when there are no changes in the cipher mode. When the cipher mode is changed, the central processing unit MCU sets said control line for a moment to a logical "1" value and resets said control line to an "0" value after a suitable length of time. Thus the length of the acoustic signal can be influenced by the duration of the "1" value state.

Data transmission between different blocks in the apparatus according to the invention can be arranged using methods known as such, wherein it is unnecessary to explain it in more detail in this context.

The method of the present invention can be advantageously applied also in mobile stations currently in use in a way that the functions required in the method are provided in the operational software of the mobile station. Thus no changes will be required in the hardware of the mobile station.

Figure 6:
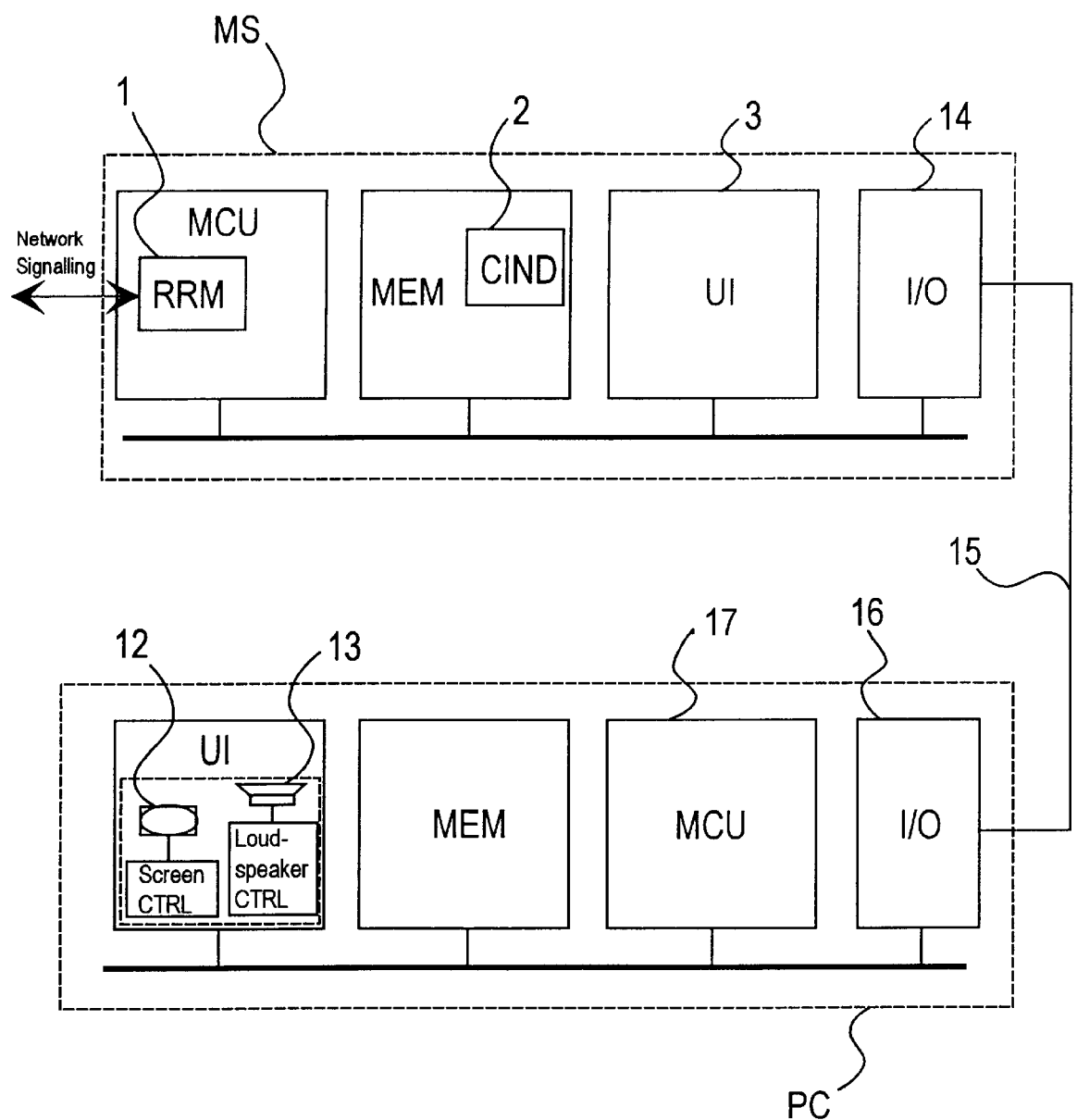
FIG. 6 is a reduced block diagram showing the implementation of a cipher mode indicating device in connection with a mobile station and a data processor.

The invention can also be applied in a way that part of the functions required in the method are provided in the operational software of the mobile station and part of them are provided in the software of a data processor which is in transmission connection with the mobile station. One such embodiment is illustrated as a reduced block diagram in FIG. 6.

In this embodiment, the mobile station is also used as a so-called wireless modem in connection with a data processor, such as a personal computer, wherein a data transmission connection is formed from the data processor PC via the mobile communication network e.g. to another data processor. In this case, it is advantageous to indicate the cipher mode as a certain sign on the display 12 of the data processor and possibly also as an acoustic signal by the acoustic signal forming element 13 of the data processor. The cipher indicator memory block 2 transmits information on a change in the cipher indication data field advantageously to the data processor PC by means of a mobile station connection element 14 and a PC connection bus 15. The data processor PC is provided with application software which controls that the data on the change in the cipher indication data field is read in the data processor PC from a data processor connection element 16 and processed preferably in the central processing unit 17 of the data processor. After this the data processor PC sends out a cipher mode enquiry message which is transmitted back to the cipher indicator memory block by means of the data processor connection element 16, the PC connection bus 15 and the mobile station connection element 14. In response to the enquiry message, the cipher indicator memory block 2 sends the cipher data to the data processor PC. From the data processor PC, the cipher data is read from the data processor connection element 16 and transmitted to the cipher mode indicator. The cipher mode indicator is preferably the display unit 12 and possibly also the acoustic signal forming element 13 of the data processor. Thus the cipher mode is indicated by a suitable symbol on the display unit 12 of the data processor. In a corresponding way, a change in the cipher mode is indicated e.g. as an acoustic signal by the acoustic signal forming element 13 of the data processor. Also the operation and structure of the data processor PC are generally known and need not be explained in more detail in this context.

Figure 7:
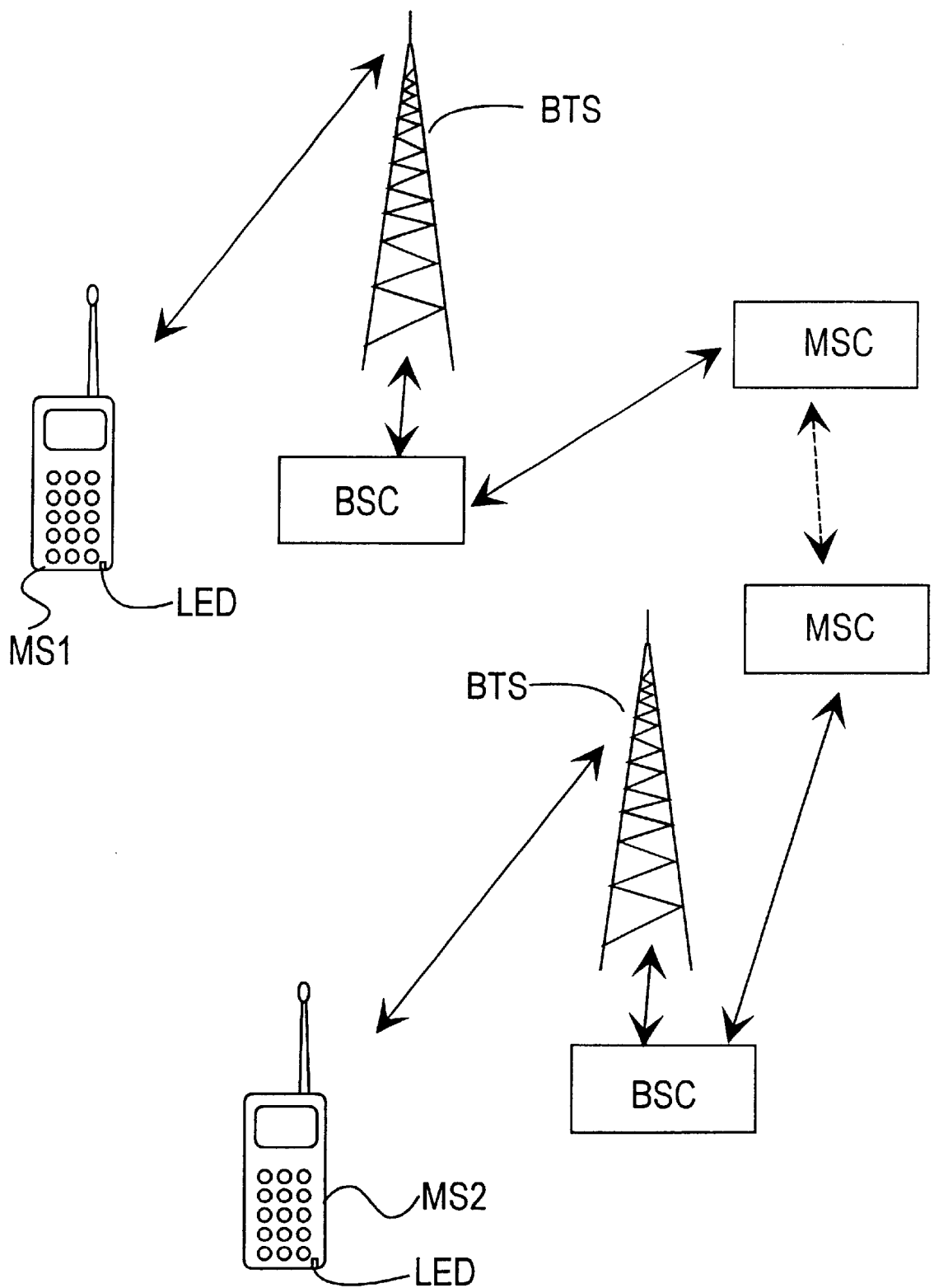
FIG. 7 is a reduced chart on a situation where a data transmission connection is formed between two mobile stations.
Figure 8:
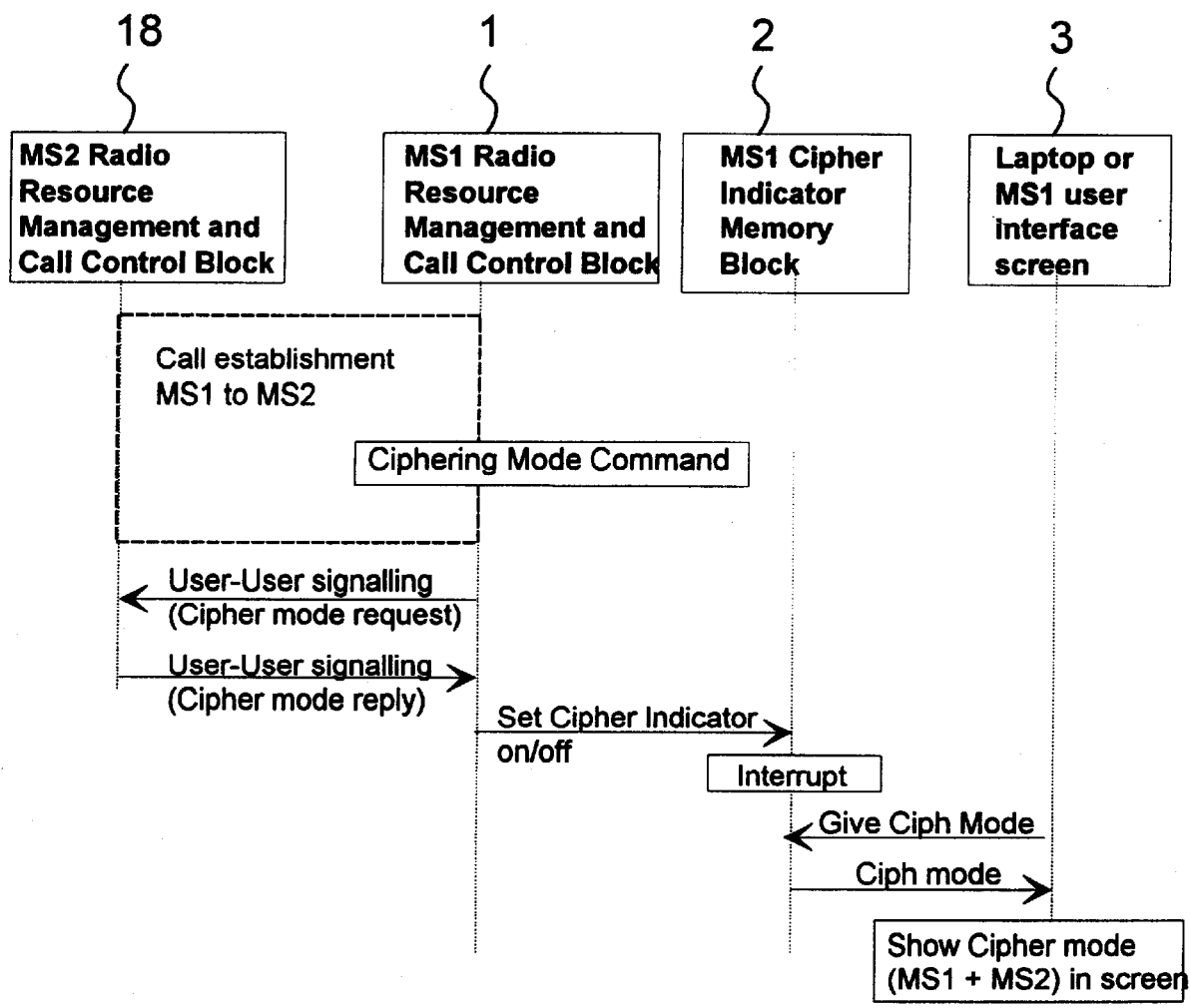
FIG. 8 is a reduced signal chart on an enquiry about the cipher mode in a situation where a data transmission connection is formed between two mobile stations.

Further, with reference to FIG. 7, the invention can be applied in situations where a data transmission connection (call) is formed between two mobile stations. Thus data transmission between the first mobile station MS1 and a mobile communication network as well as between the second mobile station MS2 and a mobile communication network takes place via the radio channel. The mobile stations MS1, MS2 can be located in areas of different base stations, wherein it is possible that the cipher mode in communication between the first mobile station MS1 and the mobile network is different than in communication between the second mobile station MS2 and the mobile network. The data transmission connection between the first mobile station MS1 and the second mobile station MS2 is formed in a way known as such. After the connection has been made, it is possible e.g. for the first mobile station MS1 to enquire the cipher mode of the second mobile station MS2 (FIG. 8). The enquiry can be made for example as call control signalling, such as in the GSM mobile network, and also if the ISDN between the mobile services switching centres MSC is in the user-user information element according to the GSM Standard 04.08. The resources control block 1 of the first mobile station MS1 forms a cipher mode enquiry message and transmits it to the second mobile station. The resource control block 18 of the second mobile station detects the cipher mode of the second mobile station and forms a response message where the cipher mode is transmitted to the resource control block 1 of the first mobile station. After this, the resource control block 1 of the first mobile station MS1 sets the cipher indication data field as disclosed above in this description. The first mobile station MS1 can also be provided with a second cipher indication data field for recording cipher data between the second mobile station MS2 and the mobile communication network. Thus the user of the mobile station MSI, MS2 can be given the cipher mode separately for communication between the first mobile station MSI and the mobile network and for communication between the second mobile station MS2 and the mobile network. In another alternative, the user of the mobile station MS1, MS2 is given the cipher mode so that if communication between both mobile stations MS1, MS2 and the mobile network is enciphered, the user of the mobile station MS1, MS2 is informed that the cipher mode is on. In a different case the user is informed that the cipher mode is off.

If the cipher mode in the second mobile station MS2 is changed during a call, it sends a message on the change in the cipher mode by useruser signalling.

For enquiring the cipher mode of communication the second mobile station MS2, also other methods can be used, such as short message services (SMS).

The ISDN telecommunication network (Integrated Services Digital Network) provides also an optional user-to-user signalling service (UUS) which makes communication possible between telecommunication terminals in a data transmission connection with each other. Thus, if a data transmission connection is made from a mobile station MS to a telecommunication terminal of the ISDN type, the mobile station MS can send the telecommunication terminal an enquiry about the cipher mode by using the user-to-user signalling service. If the telecommunication terminal does not recognize the enquiry message of the mobile station MS, the mobile station MS will not receive a response to the enquiry, or the response will consist of an unidentified command or another corresponding message. In such a case, the mobile station MS can deduce that the telecommunication terminal is not a mobile station but most probably a telecommunication terminal connected with a landline telecommunication network. In this situation, the display unit of the mobile station MS indicates the user of the mobile station for example that the cipher mode between the second telecommunication terminal and the telecommunication network is unknown.

For indicating the cipher mode and a change in the cipher mode to the user of the mobile station MS, also other methods, known as such, can be used. For example, the cipher mode can be indicated by a light source, such as a light-emitting diode (LED). Consequently, for example when the cipher mode is on, a control voltage is supplied to the LED (the LED is emitting) and when the communication is not enciphered, no control voltage is supplied to the LED (the LED is unlit). A change in the cipher mode can be advantageously indicated by flashing the LED. Thus for example when the communication is not enciphered, the LED is unlit, and when the communication becomes enciphered, the LED flashes for a moment after which the LED will emit light continuously as long as the cipher mode is on. In a corresponding manner, when the communication becomes unenciphered, the LED will flash for a moment before it is turned off.

Further, so-called vibration batteries have been developed for mobile stations whereby the mobile station can be made to vibrate in a muffled way. Thus the cipher mode of data transmission can be indicated also by a vibration battery, wherein for example upon a change in the cipher mode, a control signal is supplied to the vibration battery for a moment, which will result in vibration of the mobile station and detection of the change in the cipher mode by the user of the mobile station.

The invention is not limited only to the embodiments presented above, but it can be modified within the scope of the appended claims.

What is claimed is:

1. A method for indicating enciphering of data transmission between a mobile communication network and a mobile station in the mobile communication network, comprising steps of:
    communicating via said network a cipher control signal to establish a cipher mode, including both encrypted and unencrypted communication, in said mobile station and other terminals of said network;
    providing a cipher indication data field in the mobile station;
    initially setting said cipher indication data field into a first state;
    monitoring signals, including said cipher control signal, transferred between the mobile communication network and the mobile station;
    updating the state of said cipher indication data field on the basis of the cipher control signal; and
    on the basis of data in said cipher indication data field, indicating a cipher mode to a user of the mobile station.

2. A method according to claim 1, wherein, in addition to indicating the cipher mode, a change in the cipher mode is indicated to the user of the mobile station.

3. A method according to claim 1, wherein the data transmission connection between the mobile communication network and the mobile station is a radio connection.

4. A method according to claim 1, wherein the communication network is a digital communication network, suitable for a GSM network.

5. A method according to claim 1, wherein the mobile station comprises a display unit and an acoustic signal forming element, and the cipher mode is indicated with the display unit and a change in the cipher mode is indicated with the acoustic signal forming element.

6. A method according to claim 1, wherein the mobile station comprises a light source wherein the cipher mode is indicated with the light source.

7. A method according to claim 6, wherein a change in the cipher mode is indicated with a flashing light.

8. A method according to claim 1, wherein the cipher mode is indicated by vibration.

9. A method according to claim 1, wherein the signal to be monitored is a control signal.

10. A method according to claim 1, wherein said mobile station is a first mobile station, said first mobile station and a second mobile station are in a data transmission connection with each other via the mobile communication network, and the cipher mode between the mobile communication network and the first mobile station is indicated to a user of the second mobile station.

11. A method according to claim 1, wherein the mobile station is used in connection with a data processor for data transmission between a mobile communication network and the data processor, the data processor comprising a display unit and an acoustic signal forming element, wherein the cipher mode is indicated on a display unit of the data processor and a change in the cipher mode is indicated with the acoustic signal forming element of the data processor.

12. An apparatus for indicating enciphering of data transmission between a mobile communication network and a mobile station in the mobile communication network, said communication network employing a control signal including a cipher control signal to establish a cipher mode in said mobile station and other terminals of said network, the cipher mode including both encrypted and unencrypted communication, the apparatus comprising:

a cipher indication data field in the mobile station;

means for initially setting said cipher indication data field into a first state;

means for monitoring said control signal transferred between the mobile communication network and the mobile station;

means for examining said cipher control signal;

means for updating the state of said cipher indication data field on the basis of said examining of said cipher control signal; and means for indicating a cipher mode to a user of the mobile station on the basis of data in said cipher indication data field.

13. Apparatus according to claim 12, further comprising means for indicating a change in the cipher mode.

14. An apparatus according to claim 13, wherein the means for indicating the cipher mode comprise a display unit of the mobile station, and the means for indicating a change in the cipher mode comprise a sound generator.

15. Apparatus according to claim 13, wherein the means for indicating a change in the cipher mode comprise a light source.

16. An apparatus according to claim 13, wherein the means for indicating a change in the cipher mode comprise means for generating vibration.

17. An apparatus according to claim 12, wherein the apparatus is located in a mobile station.

18. An apparatus according to claim 13, wherein the means for indicating the cipher mode and the means for indicating a change in the cipher mode are provided in a data processor communicating with a mobile station.

19. A method for indicating enciphering of data between a mobile communication network and a second mobile station in the mobile communication network, wherein the communication network includes a first mobile station, the method comprising steps of:

communicating via said network a cipher control signal to establish a cipher mode, including both encrypted and unencrypted communication, in said mobile stations of said network;

providing a cipher indication data field in the first mobile station;

initially setting said cipher indication data field into a first state;

monitoring signals, including said cipher control signal, transferred between the mobile communication network and the second mobile station;

examining said monitored signals and said cipher control signal;

forming a cipher mode enquiry message in the first mobile station;

sending said cipher mode inquiry message to the second mobile station;

forming a cipher mode response message in the second mobile station on the basis of said examining of said monitored signals;

sending said cipher mode response message to the first mobile station;

updating the state of said cipher indication data field in the first mobile station on the basis of said cipher mode response message; and on the basis of data in said cipher indication data field, enabling the first mobile station to indicate a cipher mode between the communication network and the second mobile station to a user of the first mobile station.

20. A system for indicating enciphering of data transmission between a mobile communication network and a second mobile station in the mobile communication network, wherein the mobile communication network includes a first mobile station, the mobile communication network being suitable for transmission via a digital transmission mode, said communication network employing a control signal including a cipher control signal to establish a cipher mode in said mobile stations of said network, the cipher mode including both encrypted and unencrypted communication, the system comprising:

a cipher indication data field in the first mobile station;

means for initially setting said cipher indication data field into a first state;

means for transferring said control signal between the communication network and each of the mobile stations;

means for monitoring said control signal transmitted between the mobile communication network and the second mobile station;

means for examining said cipher control signal;

means for forming a cipher mode inquiry message in the first mobile station;

means for sending said cipher mode inquiry message to the second mobile station;

means for forming a cipher mode response message in the second mobile station on the basis of said examining of said monitored signals;

means for sending said cipher mode response message to the first mobile station;

means for updating the state of said cipher indication data field in the first mobile station on the basis of said cipher mode response message; and means for indicating a cipher mode between the communication network and the second mobile station to a user of a mobile station on the basis of data in said cipher indication data field.

21. A method for indicating enciphering of data transmission between a mobile communication network and a mobile station in the mobile communication network, wherein the mobile communications network includes a transmission of control signals from a base station to the mobile station, the communication network being suitable for transmission via a digital transmission mode, said control signals including a cipher control signal, the method comprising steps of:

communicating via said network a cipher control signal to establish a cipher mode, including both encrypted and unencrypted communication, in said mobile station and other terminals of said network;

providing a cipher indication data field in the mobile station;

initially setting said cipher indication data field into a first state;

monitoring, at the mobile station, the control signals transferred between the mobile communication network and the mobile station;

updating the state of said cipher indication data field on the basis of the cipher control signal; and on the basis of data in said cipher indication data field, indicating a cipher mode to a user of the mobile station.

22. A system for indicating enciphering of data transmission between a mobile communication network and a mobile station in the mobile communication network, wherein the mobile communication network includes a transmission of control signals including a cipher control signal from a base station to the mobile station, the communication network being suitable for transmission via a digital transmission mode, said communication network employing the cipher control signal to establish a cipher mode in said mobile and said base stations of said network, the cipher mode including both encrypted and unencrypted communication, the system comprising:

a cipher indication data field in the mobile station;

means for initially setting said cipher indication data field into a first state;

means for transferring said control signal between the mobile communication network and the mobile station;

means for monitoring said control signals transferred between the mobile communication network and the mobile station;

means for examining said cipher control signal;

means for updating the state of said cipher indication data field on the basis of said examining of said control signal; and means responsive to said cipher indication data field for enabling the mobile station to display ciphering information about transmissions between the communication network and the mobile station.

23. A method according to claim 1, wherein said mobile station is a first mobile station, said first mobile station and a second mobile station are in a data transmission connection with each other through the mobile communication network, and the cipher mode between the mobile communication network and the first mobile station is indicated to a user of the second mobile station.

24. A method for indicating enciphering of data transmission between a mobile communication network and a mobile station in the mobile communication network, comprising steps of:

communicating via said network a cipher control signal to establish a cipher mode, including both encrypted and unencrypted communication, in said mobile station and other terminals of said network;

providing a cipher indication data field in the mobile station, wherein communication is enabled between the mobile station and the communication network in correspondence with data inserted in said field by said network, and wherein a mode of communication is established in accordance with the data carried by said field;

initially setting said cipher indication data field into a first state;

monitoring signals, including said cipher control signal, transferred between the mobile communication network and the mobile station;

updating the state of said cipher indication data field on the basis of the cipher control signal; and on the basis of data in said cipher indication data field, indicating a cipher mode to a user of the mobile station.

25. An apparatus for indicating enciphering of data transmission between a mobile communication network and a mobile station in the mobile communication network, said communication network employing a control signal including a cipher control signal to establish a cipher mode in said mobile station and other terminals of said network, the cipher mode including both encrypted and unencrypted communication, the apparatus comprising:

a cipher indication data field in the mobile station, wherein communication is enabled between the mobile station and the communication network in correspondence with data inserted in said field by said network, and wherein a mode of communication is established in accordance with the data carried by said field;

means for initially setting said cipher indication data field into a first state;

means for monitoring said control signal transferred between the mobile communication network and the mobile station;

means for examining said cipher control signal;

means for updating the state of said cipher indication data field on the basis of said examining of said control signal; and means for indicating a cipher mode to a user of the mobile station on the basis of data in said cipher indication data field.

26. A method for indicating ciphering of data communication between a mobile communication network and a mobile station in the mobile communication network, the mobile communication network being suitable for data communication in digital form and having at least one enciphered mode of data communication and an unenciphered mode of data communication, indication of a selected ciphering mode to be used in communication between the communication network and the mobile station being provided in a cipher mode control signal transmitted from the communication network to the mobile station the mobile station being caused to communicate with the communication network using the selected ciphering mode upon receipt of the cipher mode control signal wherein the method comprises the steps of:

maintaining a cipher mode indication data field in the mobile station;

initially setting said cipher mode indication data field into a first state;

updating the state of the cipher mode indication data field to provide an indication of the selected ciphering mode on the basis of a received cipher mode control signal;

indicating the selected ciphering mode to a user of the mobile station.

27. A method according to claim 26 wherein in addition to indicating the selected ciphering mode to the user of the mobile station a change in the selected ciphering mode is indicated.

28. A method according to claim 26 wherein data transmission between the mobile station and the mobile communication network takes place over a radio link.

29. A method according to claim 26 wherein the mobile communication network is a GSM network.

30. A method according to claim 26 wherein the mobile station comprises a display unit and an acoustic signal forming element wherein the selected ciphering mode is indicated using the display unit and a change in the selected ciphering mode is indicated with the acoustic signal forming element.

31. A method according to claim 26 wherein the mobile station comprises a light source wherein the selected ciphering mode is indicated using the light source.

32. A method according to claim 31 wherein a change in the selected ciphering mode is indicated by causing the light source of the mobile station to flash.

33. A method according to claim 26 wherein a change in the selected ciphering mode is indicated to the user of the mobile station by vibration.

34. A method according to claim 26 wherein a first mobile station and a second mobile station are in data communication with each other through a single mobile communication network and the selected ciphering mode used in data communication between the second mobile station and the mobile communication network is indicated to a user of the first mobile station.

35. A method according to claim 26 wherein a first mobile station is in data communication with a first mobile communication network and a second mobile station is in data communication with a second mobile communication network wherein the first mobile station and the second mobile station are in communication with each other through at least the first mobile communication network and the second mobile communication network and the selected ciphering mode used in data communication between the second mobile station and the second mobile communication network is indicated to a user of the first mobile station.

36. A method according to claim 26, wherein the mobile station is used in connection with an external data processor to enable data communication between a mobile communication network and the external data processor said external data processor comprising a display unit wherein the selected ciphering mode is indicated on the display unit of the external data processor.

37. A method according to claim 26 wherein the mobile station is used in connection with an external data processor to enable data transmission between the external data processor and the mobile communication network wherein the mobile station provides an indication of the selected ciphering mode to the external data processor.

38. A method according to claim 26 wherein the mobile station is used in connection with an external data processor to enable data communication between the external data processor and the mobile communication network wherein the mobile station provides and indication of a change in selected ciphering mode to the external data processor.

39. A method according to claim 36 wherein the external data processor comprises an acoustic signal forming element and wherein a change in the selected ciphering mode is indicated using the acoustic signal forming element of the external data processor.

40. A method according to claim 26 wherein the mobile station is a wireless modem connected to an external data processor.

41. A method according to claim 26 wherein the mobile station is a wireless modem that can be removably connected to an external data processor.

42. A method according to claim 26 wherein the steps characteristic of the method are performed prior to a call being established.

43. A method according to claim 26 wherein the communication network comprises at least a first part and a second part the steps characteristic of the method being performed in connection with handover of data transmission wherein data transmission takes place between the mobile station and the first part of the communication network prior to handover and data transmission takes place between the mobile station and the second part of the communication network after handover.

44. A method for indicating enciphering of data transmission between a mobile communication network and a mobile station in the mobile communication network, comprising steps of:
   indicating a transmission mode to be used in communication in the mobile communication network selected from a set of communication modes having at least one ciphered mode and an unciphered mode;
   providing a cipher indication data field in the mobile station;
   initially setting said cipher indication data field into a first state;
   transferring a control signal between the mobile communication network and the mobile station,
   monitoring signals transferred between the mobile communication network and the mobile station;
   if said monitored signals comprise a cipher control signal, updating the state of said cipher indication data field on the basis of the cipher control signal;
   causing the mobile terminal to transmit in the enciphered mode indicated; and
   on the basis of data in said cipher indication data field, indicating a cipher mode to a user of the mobile station.

45. A method according to claim 44, characterized in that in addition to indicating the cipher mode, a change in the cipher mode is indicated to the user of the mobile station.

46. A method according to claim 44, characterized in that the data transmission connection between the mobile communication network and the mobile station is a radio connection.

47. A method according to claim 44, characterized in that the communication network is a digital communication network, such as a GSM network.

48. A method according to claim 44, wherein the mobile station comprises a display unit and an acoustic signal forming element, characterized in that the cipher mode is indicated with the display unit and a change in the cipher mode is indicated with the acoustic signal forming element.

49. A method according to claim 44, wherein the mobile station comprises a light source, characterized in that the cipher mode is indicated with the light source.

50. A method according to claim 49, characterized in that a change in the cipher mode is indicated with a flashing light.

51. A method according to claim 44, characterized in that the cipher mode is indicated by vibration.

52. A method according to claim 44, wherein a first mobile station and a second mobile station are in a data transmission connection with each other through at least one mobile communication network, and the cipher mode between the mobile communication network and the first mobile station is indicated to a user of the second mobile station.

53. A method according to claim 44, wherein the mobile station is used in connection with an external data processor for data communication between a mobile communication network and the external data processor, comprising a display unit and an acoustic signal forming element, wherein the cipher mode is indicated on the display unit of the external data processor and a change in the cipher mode is indicated with the acoustic signal forming element of the external data processor.

54. An apparatus for indicating enciphering of data communication between a mobile communication network and a mobile station, indication of a communication mode to be used in the digital mobile communication network being provided to the mobile station as a cipher mode control signal, said communication mode being selected from a set of communication modes comprising at least one ciphered mode and an unciphered mode, the apparatus comprising:
   a cipher mode indication data field;
   means for setting said cipher indication data field into an initial first state;
   means for monitoring said control signal transferred between the mobile communication network and the mobile station to identify a cipher mode control signal;
   means for updating the state of the cipher mode indication data field on the basis of an identified cipher mode control signal; and
   means for indicating a cipher mode to a user of the mobile station according to the state of the cipher mode indication data field.

55. An apparatus according to claim 54, characterized in that the apparatus further comprises means for indicating a change in the cipher mode.

56. An apparatus according to claim 54, characterized in that the means for indicating the cipher mode comprise a display unit of the mobile station, and the means for indicating a change in the cipher mode comprise a sound generator.

57. An apparatus according to claim 54, characterized in that the means for indicating a change in the cipher mode comprise a light source.

58. An apparatus according to claim 54, characterized in that the means for indicating a change in the cipher mode comprise means for generating vibration.

59. An apparatus according to claim 54, characterized in that it is provided in a mobile station.

60. An apparatus according to claim 54, characterized in that the means for indicating the cipher mode and the means for indicating a change in the cipher mode are provided in an external data processor communicating with a mobile station.

61. A method of indicating the enciphering of data communication between a digital mobile communication network and a second mobile station at a first mobile station in the digital mobile communication network, the communication mode used in data communication between the second mobile station and the digital mobile communication network being selected from a set of communication modes having at least one ciphered mode and an unciphered mode, the method comprising steps of:
   providing a cipher mode indication data field in the first mobile station;
   initially setting said cipher mode indication data field in the first mobile station into a first state;
   forming a cipher mode enquiry message in the first mobile station;
   sending the cipher mode enquiry message to the second mobile station;
   forming a cipher mode response message in the second mobile station indicating the cipher mode used in data communication between the second mobile station and the digital mobile communication network;
   sending the cipher mode response message to the first mobile station;
   receiving the cipher mode response message at the first mobile station;
   updating the state of the cipher mode indication data field in the first mobile station on the basis of said cipher mode response message; and
   enabling the first mobile station to indicate the cipher mode used in data communication between the digital communication network and the second mobile station according to the state of the cipher mode indication data field.

62. A system for indicating enciphering of data transmission between a digital mobile communication network and a second mobile station at a first mobile station in the digital mobile communication network, the communication mode used in data communication between the second mobile station and the digital mobile communication network being selected from a set of communication modes having at least one ciphered mode and an unciphered mode, the system comprising:
   a cipher mode indication data field in the first mobile station;
   means for initially setting the cipher mode indication data field in the first mobile station into a first state;
   means for forming a cipher mode enquiry message in the first mobile station;
   means for sending the cipher mode enquiry message to the second mobile station;
   means for forming a cipher mode response message in the second mobile station indicating the cipher mode used in data communication between the second mobile station and the digital mobile communication network;
   means for sending said cipher mode response message to the first mobile station;
   means for receiving the cipher mode response message at the first mobile station;
   means for updating the state of the cipher mode indication data field in the first mobile station on the basis of said cipher mode response message; and
   means for enabling the first mobile station to indicate the cipher mode used in data communication between the communication network and the second mobile station to a user of the first mobile station according to the state of the cipher mode indication data field.

63. A mobile station having an apparatus for indicating ciphering of data communication between a mobile communication network and said mobile station in the digital mobile communication network, indication of a communication mode to be used in the digital mobile communication network being provided to the mobile station as a cipher mode control signal, said communication mode being selected from a set of communication modes comprising at least one ciphered mode and an unciphered mode, the mobile station comprising:
   a cipher mode indication data field;
   means for setting said cipher indication data field into an initial state;
   means for monitoring said control signal transferred between the mobile communication network and the mobile station to verify a cipher mode control signal;
   means for updating the state of the cipher mode indication data field on the basis of an identified cipher mode control signal; and
   means for indicating a cipher mode to a user of the mobile station according to the state of the cipher indication data field.

64. A mobile station according to claim 63 in which the cipher mode is indicated to the user of the mobile station prior to a call being established.

65. A mobile station according to claim 63 having means for performing a location update procedure for updating the location of the mobile station, wherein said control signal is transmitted in connection with the location update procedure.

66. A system for indicating ciphering of data communication between a mobile communication network and a mobile station in the mobile communication network, the mobile communication network being suitable for data communication in digital form and having at least one enciphered mode of data communication and an unenciphered mode of data communication, indication of a selected ciphering mode to be used in communication between the communication network and the mobile station being provided in a cipher mode control signal transmitted from the communication network to the mobile station, the mobile station being caused to communicate with the communication network using the selected ciphering mode upon receipt of the cipher mode control signal, wherein the system comprises:

means for maintaining a cipher mode indication data field in the mobile station;

means for initially setting said cipher mode indication data field into a first state;

means for updating the state of the cipher mode indication data field to provide an indication of the selected ciphering mode on the basis of a received cipher mode control signal;

means for indicating the selected ciphering mode to a user of the mobile station.

67. A mobile station having an apparatus for indicating enciphering of data transmission between a mobile communication network and said mobile station in the mobile communication network, the mobile communication network being suitable for data transmission in digital form and having at least one enciphered mode of data transmission and an unenciphered mode of data transmission, indication of a selected ciphering mode to be used in communication between the communication network and the mobile station being provided in a cipher mode control signal transmitted from the communication network to the mobile station the mobile station being caused to communicate with the communication network using the selected ciphering mode upon receipt of the cipher mode control signal wherein the apparatus comprises:

means for maintaining a cipher mode indication data field in the mobile station;

means for initially setting said cipher mode indication data field into a first state; means for updating the state of the cipher mode indication data field to provide an indication of the selected ciphering mode on the basis of a received cipher mode control signal;

means for indicating the selected ciphering mode to a user of the mobile station.

68. A method for indicating ciphering of data communication between a digital mobile communication network and a mobile station in the digital mobile communication network, the digital mobile communication network being suitable for data communication in digital form and having at least one enciphered mode of data communication and an unenciphered mode of data communication, indication of a selected ciphering mode to be used in communication between the digital communication network and the mobile station being provided in a cipher mode control signal transmitted from the digital communication network to the mobile station the mobile station being caused to communicate with the digital communication network using the selected ciphering mode upon receipt of the cipher mode control signal wherein the method comprises the steps of:

maintaining a cipher mode indication data field in the mobile station;

initially setting said cipher mode indication data field into a first state;

updating the state of the cipher mode indication data field to provide an indication of the selected ciphering mode on the basis of a received cipher mode control signal;

indicating the selected ciphering mode to a user of the mobile station.

69. A method for indicating ciphering of data communication between a digital mobile communication network and a mobile station in the digital mobile communication network, the digital mobile communication network being suitable for data communication in digital form and having at least one enciphered mode of data communication and an unenciphered mode of data communication, indication of a selected ciphering mode to be used in communication between the digital communication network and the mobile station being provided in a cipher mode control signal transmitted from the digital communication network to the mobile station, wherein the method comprises the steps of:

maintaining a cipher mode indication data field in the mobile station;

initially setting said cipher mode indication data field into a first state;

updating the state of the cipher mode indication data field to provide an indication of the selected ciphering mode on the basis of a received cipher mode control signal;

indicating the selected ciphering mode to a user of the mobile station.

70. A method according to claim 44, wherein a first mobile station is in data communication with a first digital mobile communication network and a second mobile station is in data communication with a second digital mobile communication network wherein the first mobile station and the second mobile station are in data communication with each other through at least the first mobile communication network and the second digital mobile communication network and the cipher mode used in data communication between the second mobile station and the second mobile communication network is indicated to a user of the first mobile station.

71. An apparatus according to claim 54, wherein the means for indicating a change in cipher mode comprises an acoustic signal forming element.

72. An apparatus according to claim 54, characterized in that it is provided in a wireless modem.

73. A system for indicating ciphering of data communication between a mobile communication network and a mobile station in the mobile communication network, the mobile communication network being suitable for data communication in digital form and having at least one enciphered mode of data communication and an unenciphered mode of data communication, indication of a selected ciphering mode to be used in communication between the communication network and the mobile station being provided in a cipher mode control signal transmitted from the communication network to the mobile station, the mobile station being caused to communicate with the communication network using the selected ciphering mode upon receipt of the cipher mode control signal, wherein the system comprises:

means for maintaining a cipher mode indication data field in the mobile station;

means for initially setting said cipher mode indication data field into a first state;

means for updating the state of the cipher mode indication data field to provide an indication of the selected ciphering mode on the basis of a received cipher mode control signal;

means for indicating the selected ciphering mode to a user of the mobile station.

74. A system for indicating ciphering of data communication between a digital mobile communication network and a mobile station in the digital mobile communication network, the digital mobile communication network being suitable for data communication in digital form and having at least one enciphered mode of data communication and an unenciphered mode of data communication, indication of a selected ciphering mode to be used in communication between the digital communication network and the mobile station being provided in a cipher mode control signal transmitted from the digital communication network to the mobile station, the mobile station being caused to communicate with the digital communication network using the selected ciphering mode upon receipt of the cipher mode control signal, wherein the system comprises:

means for maintaining a cipher mode indication data field in the mobile station;

means for initially setting said cipher mode indication data field into a first state;

means for updating the state of the cipher mode indication data field to provide an indication of the selected ciphering mode on the basis of a received cipher mode control signal;

means for indicating the selected ciphering mode to a user of the mobile station.

75. A system for indicating ciphering of data communication between a digital mobile communication network and a mobile station in the digital mobile communication network, the digital mobile communication network being suitable for data communication in digital form and having at least one enciphered mode of data communication and an unenciphered mode of data communication, indication of a selected ciphering mode to be used in communication between the digital communication network and the mobile station being provided in a cipher mode control signal transmitted from the digital communication network to the mobile station, wherein the system comprises:

means for maintaining a cipher mode indication data field in the mobile station;

means for initially setting said cipher mode indication data field into a first state;

means for updating the state of the cipher mode indication data field to provide an indication of the selected ciphering mode on the basis of a received cipher mode control signal;

means for indicating the selected ciphering mode to a user of the mobile station.

76. A mobile station having an apparatus for indicating enciphering of data communication between a mobile communication network and said mobile station in the mobile communication network, the mobile communication network being suitable for data communication in digital form and having at least one enciphered mode of data communication and an unenciphered mode of data communication, indication of a selected ciphering mode to be used in communication between the communication network and the mobile station being provided in a cipher mode control signal transmitted from the communication network to the mobile station, the mobile station being caused to communicate with the communication network using the selected ciphering mode upon receipt of the cipher mode control signal, wherein the apparatus comprises:

means for maintaining a cipher mode indication data field in the mobile station;

means for initially setting said cipher mode indication data field into a first state;

means for updating the state of the cipher mode indication data field to provide an indication of the selected ciphering mode on the basis of a received cipher mode control signal;

means for indicating the selected ciphering mode to a user of the mobile station.

77. A system for indicating ciphering of data communication between a second mobile communication network and a second mobile station at a first mobile station communicating in a first mobile communication network, the second mobile communication network being suitable for data communication in digital form and having at least one enciphered mode of data communication and an unenciphered mode of data communication, indication of a selected ciphering mode to be used in communication between the second communication network and the second mobile station being provided in a cipher mode control signal transmitted from the second communication network to the second mobile station, the second mobile station being caused to communicate with the second communication network using the selected ciphering mode upon receipt of the cipher mode control signal, wherein the system comprises:

a cipher mode indication data field in the first mobile station;

means for initially setting the cipher mode indication data field in the first mobile station into a first state;

means for forming a cipher mode enquiry message in the first mobile station;

means for sending the cipher mode enquiry message to the second mobile station;

means for forming a cipher mode response message in the second mobile station indicating the cipher mode used in data communication between the second mobile station and the second digital mobile communication network;

means for sending said cipher mode response message to the first mobile station;

means for receiving the cipher mode response message at the first mobile station;

means for updating the state of the cipher mode indication data field in the first mobile station on the basis of said cipher mode response message; and means for enabling the first mobile station to, indicate the cipher mode used in data communication between the second communication network and the second mobile station to a user of the first mobile station according to the state of the cipher mode indication data field.

* * * * *